United States Patent [19]

Lyall

[11] Patent Number: 4,695,335

[45] Date of Patent: Sep. 22, 1987

[54] METHOD FOR DEVELOPING A PREDETERMINED FUSING TEMPERATURE IN THERMOPLASTIC ITEMS

[75] Inventor: Lucian H. Lyall, Woodland Hills, Calif.

[73] Assignee: R. W. Lyall & Company, Inc., Santa Fe Springs, Calif.

[21] Appl. No.: 796,565

[22] Filed: Nov. 8, 1985

[51] Int. Cl.$^4$ .............................................. B32B 31/26
[52] U.S. Cl. ..................... 156/64; 138/155; 156/274.2; 156/304.2; 156/359; 156/378; 156/379.7; 219/535; 285/292
[58] Field of Search ............... 138/155; 156/64, 274.2, 156/304.2, 359, 378, 379.7, 380.2; 219/535; 285/292

[56] References Cited

U.S. PATENT DOCUMENTS

| 2,972,780 | 2/1961 | Boonstra . | |
|---|---|---|---|
| 3,345,439 | 10/1967 | Everard et al. | 264/26 |
| 3,378,672 | 4/1968 | Blumenkranz | 219/200 |
| 3,465,126 | 9/1969 | Blumenkranz | 219/182 |
| 3,506,519 | 4/1970 | Blumenkranz | 156/275 |
| 3,788,928 | 1/1974 | Wise | 156/274.2 X |
| 3,800,123 | 3/1974 | Maahs | 219/407 |
| 3,812,323 | 5/1974 | Pink | 219/535 |
| 4,238,670 | 12/1980 | Maitenaz | 219/413 |
| 4,334,146 | 6/1982 | Sturm | 219/535 X |
| 4,375,591 | 3/1983 | Sturm | 219/544 |
| 4,416,713 | 11/1983 | Brooks | 156/64 |
| 4,486,648 | 12/1984 | Grasso | 219/501 |
| 4,511,789 | 4/1985 | Goessler et al. | 219/446 |
| 4,571,488 | 2/1986 | Reeves | 219/544 |
| 4,602,148 | 7/1986 | Ramsey | 219/535 |

Primary Examiner—Robert A. Dawson
Attorney, Agent, or Firm—Fulwider Patton Rieber Lee & Utecht

[57] ABSTRACT

A method and apparatus for thermal fusion of thermoplastic pipes. Heat is applied to a joint interface between thermoplastic pipes and a thermoplastic coupling at a slow rate to raise the temperature of the interface to a predetermined preheat temperature, and then at a rapid rate to quickly raise the temperature to the fusion point, resulting in proper localized fusion heating at the joint interface.

9 Claims, 2 Drawing Figures

METHOD FOR DEVELOPING A PREDETERMINED FUSING TEMPERATURE IN THERMOPLASTIC ITEMS

BACKGROUND OF THE INVENTION

1. Field of the Invention

The present invention relates generally to apparatus and methods for the controlled application of heat to develop a predetermined temperature for fusing thermoplastic items together.

2. The Prior Art

It is well known to fuse thermoplastic pipes together by using a cylindrical thermoplastic coupling containing a heating coil. The coil is energized to provide localized heating at the interface between the pipes and the coupling, raising the temperature at the interface to a fusion temperature that is high enough to fuse the coupling and the pipes together.

The pipes will quickly melt and deform if they are maintained at the fusion temperature for more than a very brief time. Consequently, in order to achieve fusion without melting the pipes it is necessary to raise the interface temperature very rapidly until the fusion temperature has been reached and then to allow the interface to cool before the remainder of the pipes has reached the fusion temperature.

If the heat from the heating coil diffuses uniformly through the interface area, the pipes and the coupling will fuse into a mechanically strong, leakproof connection. However, the heat does not diffuse uniformly if prior art methods are used. Instead, the heat diffuses non-uniformly, resulting in hot spots at which the pipes melt and cold spots at which no fusion takes place. The end result is a weak connection prone to leakage or mechanical failure. Non-uniform heat diffusion is a particular problem when the ambient temperature is low, as in the winter.

Accordingly, there is a need for a reliable way to diffuse heat uniformly throughout the interface between the pipes and the coupling, especially at low ambient temperatures, without melting or damaging the pipes.

SUMMARY OF THE INVENTION

The present method and apparatus develops a predetermined fusion temperature at an interface between a cylindrical thermoplastic coupling and thermoplastic pipes to be coupled. The apparatus utilizes heating means and temperature sensing means disposed adjacent the interface to fuse the pipes and the coupling to form a mechanically strong, leakproof connection.

The method is characterized by heating the interface in two steps. The temperature first is slowly raised to a "preheat" temperature above the ambient temperature but below the melting point of the thermoplastic and then is rapidly raised to the fusion temperature. This two-step process avoids uneven heat distribution and the resulting poor fusion joints that are characteristic of prior art heating methods wherein the temperature is rapidly raised from the ambient temperature all the way to the fusion temperature.

In a preferred embodiment, the invention comprises means for applying an electric current to a heating coil embedded in a pipe coupling sleeve disposed about the pipes to be joined. Initially, the temperature at the interface is slowly raised to the preheat temperature. Then a fusion temperature control responsive to a temperature sensor adjacent the fusion interface increases the magnitude of the current to rapidly raise the interface temperature from the preheat temperature to the fusion temperature. A limit temperature control terminates the flow of the current when the fusion temperature is reached.

In a more specific embodiment of the invention, desired preheat and fusion temperatures may be manually selected by an operator. Means are provided to adjust the heating rate according to the diameter of the pipes being joined. An optional continuity test permits the operator to test the heating coil and its connections before the fusion process is begun.

The present invention enables proper fusion of thermoplastic pipes, particularly at low ambient temperatures, by precise control over the flow of heat throughout the fusion heating steps.

Other aspects and advantages of the present invention will become apparent from the following more detailed description taken in conjunction with the accompanying drawings.

DESCRIPTION OF THE PREFERRED EMBODIMENT

Fusion of thermoplastic pipes has been adversely affected by uneven distribution of heat during the fusion process, particularly when the fusion is carried out under conditions of low ambient temperature. The present invention provides a two-step heating process whereby the temperature of the interface between the pipes and a coupling is slowly raised to a preheat temperature and then rapidly raised to the fusion temperature. Heat is distributed uniformly throughout the interface during fusion, assuring a mechanically strong, leakproof connection.

Figure 1:
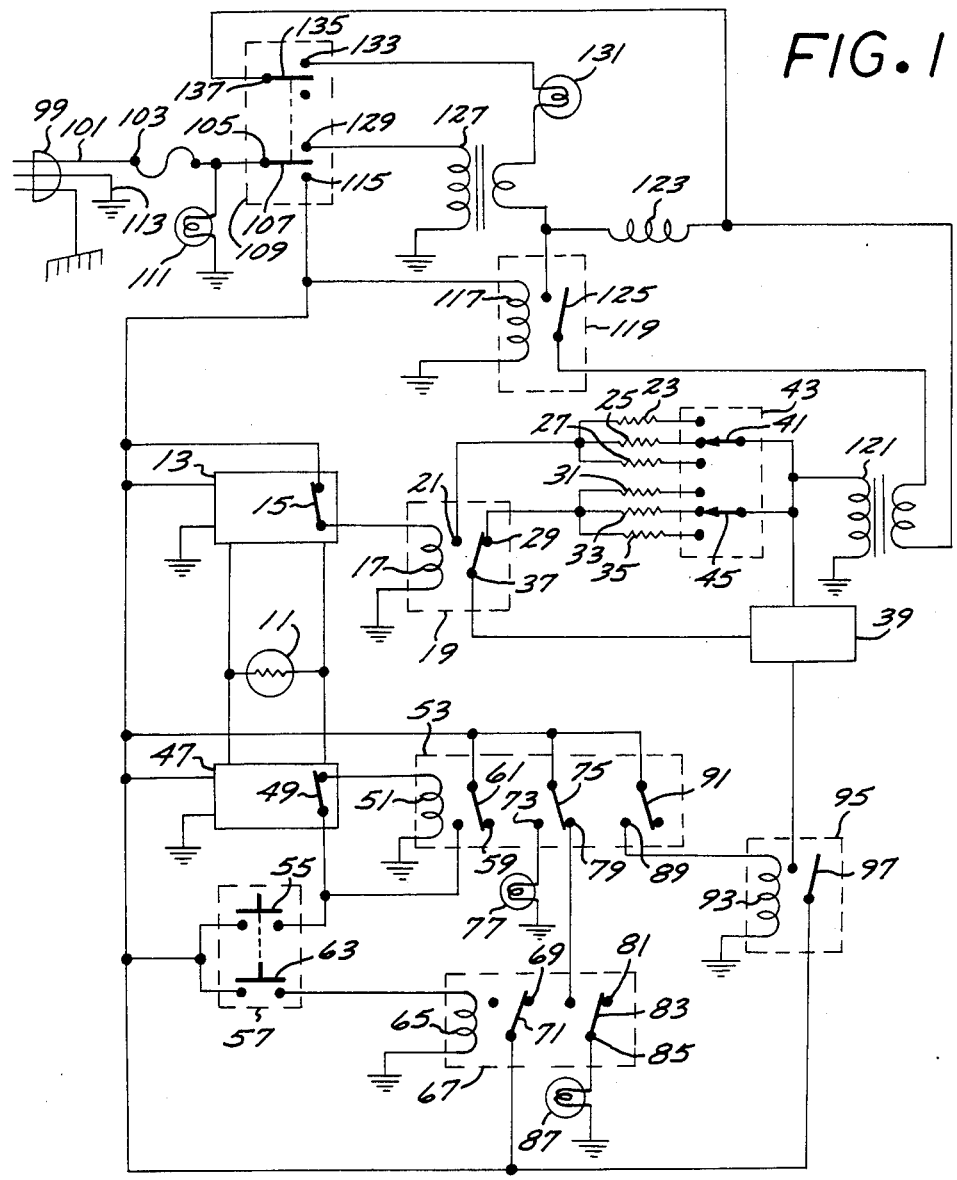
FIG. 1 is a schematic diagram of an apparatus according to the present invention.
Figure 2:
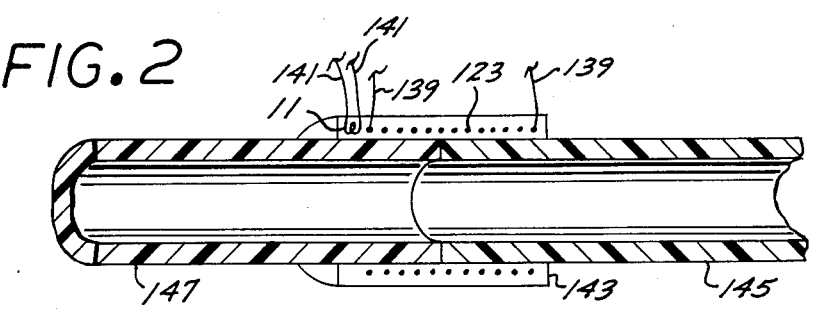
FIG. 2 is a sectional perspective view of a pair of thermoplastic pipes placed in abutting relationship for fusing within a coupling having a heating element and a temperature sensor.

Referring now to FIGS. 1 and 2 of the drawings, the present invention comprises, generally, a temperature sensor in the form of a thermocouple 11 connected to a fusion temperature controller 13. The fusion temperature controller 13 includes a normally closed switch contact 15 having a first terminal connected to one side of a coil 17 of a relay 19. The other side of the coil 17 is connected to a common return. The relay 19 has an SPDT switch contact including a normally-open terminal 21 that is connected to one lead each of resistors 23, 25 and 27, a normally-closed terminal 29 that is connected to one lead each of resistors 31, 33 and 35, and a common terminal 37 that is connected to a first input to a phase controller 39. The other leads of resistors 23, 25 and 27 are connected to three selectable terminals associated with a first common terminal 41 of a DP3T pipe size selector switch 43. The other leads of resistors 31, 33 and 35 are connected to three selectable terminals associated with a second common terminal 45 of the switch 43. The common terminals 41 and 45 are connected together and to a second input to the phase controller 39.

The temperature sensor 11 is also connected to a limit temperature controller 47 that contains a normally-closed switch contact 49. The switch contact 49 has a first terminal connected to one side of a coil 51 of a relay 53, and a second terminal connected to a first terminal of a first switch contact 55 of a DPST normally-open "start fusion" pushbutton 57 and to a normally-open terminal 59 of a first switch contact 61 of the relay 53. The other side of the coil 51 is connected to the common return. A first terminal of a second switch contact 63 of the pushbutton 57 is connected to one side of a coil 65 of a relay 67 and to a normally-open terminal 69 of a first switch contact 71 of the relay 67. The other side of the coil 65 is connected to the common return.

A normally-open terminal 73 of a second switch contact 75 of the relay 53 is connected to one side of a "fusion in process" indicator lamp 77. The other side of the lamp 77 is connected to the common return. A normally-closed terminal 79 of the second contact 75 is connected to a normally-open terminal 81 of a second switch contact 83 of the relay 67. A common terminal 85 of the second switch contact 83 is connected to one side of a "fusion completed" indicator lamp 87. The other side of the lamp 87 is connected to the common return.

A normally-open terminal 89 of a third switch contact 91 of the relay 53 is connected to one side of a coil 93 of a relay 95. The other side of the coil 93 is connected to the common return. A first terminal of a normally-open switch contact 97 of the relay 95 is connected to a power input to the phase controller 39.

A power connector plug 99 has a first power lead 101 connected through a fuse 103 to a common terminal 105 of a first switch contact 107 of a DPDT center-off power switch 109 and to one side of a pilot lamp 111. A second power lead 113, and the other side of the pilot lamp 111, are connected to the common return. A "fusion mode" power supply terminal 115 of the switch 109 is connected to a first side of a coil 117 of a relay 119. The other side of the coil 117 is connected to the common return. The power supply terminal 115 is also connected to the following: a second terminal of switch contact 15; all three common terminals of the switch contacts of relay 53; second terminals of both switch contacts of button 57; a common terminal of the first switch contact 71 of the relay 67; a second terminal of the switch contact 97 of the relay 95; and first power input connections to controllers 13 and 47. Second power input connections to controllers 13 and 47 are connected to the common return.

A transformer 121 has a primary connected between a power output connection of the phase controller 39 and the common return, and a secondary connected between one side of a heater coil 123 and one terminal of an SPST switch contact 125 of the relay 119. The other terminal of the switch contact 125 is connected to the other side of the heater coil 123.

A transformer 127 has a primary connected between a "continuity mode" power supply terminal 129 of the switch 109 and the common return, and a secondary connected between one side of the coil 123 and one side of a continuity test lamp 131. The other side of the continuity test lamp 131 is connected to a first terminal 133 of a "continuity mode" switch contact 135 of the switch 109. A second terminal 137 of the switch contact 135 is connected to the other side of the coil 123.

The coil 123 with its connecting wires 139, and the temperature sensor 11 with its connecting wires 141, are embedded in heat exchange relationship within a thermoplastic coupling 143 as shown in FIG. 2. Two sections of pipe 145 and 147 are disposed inside the coupling 143 for fusion.

The continuity of the heating coil and its connections may be tested by placing the power switch 109 in the "continuit test mode" position, thereby connecting the terminals 105 and 129 together to provide A.C. power to the primary of transformer 127 and connecting terminals 133 and 137 together to establish a closed circuit connecting the heating coil 123, the continuity indicator lamp 131, and the secondary of the transformer 127. Continuity is indicated by illumination of the lamp 131. During the continuity test, the switch contact 125 of the relay 119 is open, thereby disconnecting the secondary of the transformer 121 from the heating coil 123.

Placing the power switch 109 in the "fusion mode" prepares the circuit to carry out the fusion process by connecting the terminals 105 and 107 together to provide A.C. power to the temperature controllers 13 and 47 and to the relay 119. The switch contact 125 of the relay 119 connects the heating coil 123 to the secondary of the transformer 121, thereby enabling operation of the heating coil 123.

The process of fusing the pipes 145 and 147 with the coupling 143 is begun by pushing the button 57 to momentarily close the contacts 55 and 63, thereby energizing both relays 53 and 67. Once energized, the relay 53 is retained in its energized state by a flow of current through the switch contacts 61 and 49, and the relay 67 is retained in its energized state by the switch contact 71. As long as the relay 53 remains energized, the "fusion in process" lamp 77 is illuminated by a flow of current through switch contact 75, and the relay 95 is energized by the flow of current through the switch contact 91. The switch contact 97 of the relay 95 enables current to flow to the phase controller 39. The phase controller 39 applies a portion of the current to the primary of the transformer 121 and thence to the heating coil 123, thereby warming the coil 123.

The switch contact 15 of the fusion temperature controller 13 is initially closed, thereby energizing the relay 19 and, through the relay switch contact 21, connecting one of the three resistors 23, 25 or 27 to the phase controller 39. Which one of said three resistors is connected to the phase controller 39 is determined by the setting of the pipe size selector switch 43. The size of the resistor connected to the phase controller 39 governs the amount of current that is applied to the transformer 121 and hence the rate of heat output from the coil 123; accordingly, the resistors 23, 25 and 27 are selected so that, according to the size of the pipes being fused, the coil 123 will deliver a quantity of heat that will result in a slow temperature rise and a uniform distribution of heat through the fusion area.

The voltage output of the temperature sensor 11 changes in proportion to the rising temperature at the interface. When the resistance of the sensor 11 reaches a value corresponding to a desired preheat temperature, the switch contact 15 of the fusion temperature controller 13 opens, thereby deenergizing the relay 19 and causing one of the resistors 31, 33 or 35 to be connected to the phase controller 39 in place of the resistors 23, 25 or 27. Which one of said three resistors is connected to the phase controller 39 is determined by the setting of the pipe size selector switch 43, and the resistors 31, 33 and 35 are selected so that, according to the size of the pipes being fused, the coil 123 will deliver a quantity of heat that will result in a rapid rise in temperature toward a desired fusion temperature.

When the output of the sensor 11 reaches a value corresponding to the desired fusion temperature, the switch contact 49 of the limit temperature controller 47 opens, thereby deenergizing the relay 53 and, through the switch contact 91, also deenergizing the relay 95. This terminates the flow of current to the heating coil 123 and enables the thermoplastic to cool. At the same time, the flow of current through the terminal 73 of the switch contact 75 is interrupted, extinguishing the "fusion in process" lamp 77, and current flow is enabled through the terminal 79 of the switch contact 75 and through terminal 81 of the switch contact 83, illuminating the "fusion complete" lamp 87 to indicate that the cycle has been concluded.

In the preferred embodiment of the invention, the transformer 121 is a step-down transformer having a turns ratio of about 3:2. However, it will be apparent that a transformer having some other ratio could be used instead, depending on how much driving voltage is required by the heating coil 123. The transformer 127 has a secondary voltage of 12 volts, but this is not critical and some other suitable low voltage could be used instead. The phase controller 39 is a type PH20A manufactured by SSAC Corporation. The fusion temperature controller 13 is a type MC-1, and the limit temperature controller 47 is a type MF-1, both manufactured by RKC Corporation. It will be apparent that none of these items are critical and that other like devices could be used instead.

In summary, thermoplastic pipes are fused according to the present invention by applying heat at a low rate to the interface between the pipes and a thermoplastic coupling so that the heat diffuses uniformly throughout the interface. This continues until the temperature of the interface rises to a preheat temperature above the ambient temperature but below the melting point of the thermoplastic. Heat is then applied at a rapid rate to raise the temperature to the fusion point. Means have also been described to provide a preliminary continuity test and to adjust the rate of heat flow according to the size of the pipes being fused.

The invention produces mechanically secure connections even where the fusion is accomplished under conditions of extreme cold, a result not heretofore achieved in the prior art.

While various temperatures may be applicable for different thermoplastics and different ambient temperatures, it has been determined that for a coupling collar and pipe sections constructed of medium density polyethylene which melts at about 265° F., to be fused at 0° F. to −30° F., a preheat temperature of 150° F. and fusion temperature of 300°–310° F. at the thermocouple sensor 11 provides excellent fusion. It will be appreciated that the temperature along the length of the collar may vary from the 300°–310° F. and may, at the longitudinal center of the collar raise to about 330° F.

Various modifications and changes may be made with regard to the foregoing detailed description without departing from the spirit of the invention. It is therefore to be understood that, within the scope of the appended claims, the invention may be practiced otherwise than as specifically described.

I claim:

1. A method of developing a predetermined fusion welding temperature at an interface between a thermoplastic collar and abutting thermoplastic pipe sections over which such collar is telescoped, comprising:
   increasing the temperature of the interface at a relatively slow preheating rate;
   sensing the attainment of a predetermined preheat temperature at the interface;
   increasing the temperature of the interface at a relatively fast fusion rate only upon attainment of said predetermined preheat temperature;
   sensing the attainment of said predetermned fusion welding temperature at the interface; and
   allowing the interface to cool when said predetermined fusion welding temperature has been attained.

2. The method of claim 1 for fusion welding medium density polyethylene meltable at about 265° F. and wherein:
   said step of sensing attainment of a predetermined preheat temperature senses a preheat temperature of substantially 150° F.

3. The method of claim 1 wherein:
   said step of sensing the attainment of said predetermined fusion temperature senses a predetermined fusion temperature of substantially 300° F.

4. The method of claim 2 wherein:
   said step of sensing the attainment of said predetermined fusion temperature senses a predetermined fusion temperature of substantially 300° F.

5. The method according to claim 1 and further comprising, before the step of increasing the temperature of the interface at a relatively slow preheating rate, the step of testig the continuity of the heating coil and any wires connected thereto.

6. The method according to claim 1 and further comprising, before the step of increasing the temperature of the the interface at a relatively slow preheating rate, the step of selecting a desire rate of heating.

7. The method according to claim 1 wherein said step of heating the interface at a relatively fast fusion rate occurs upon attainment of a preheat temperature of substantially 150 degrees F.

8. The method according to claim 1 wherein said step of allowing the interface to cool occurs upon attainmetn of a fusion welding temperature of substantially 300 degrees F.

9. The method according to claim 7 wherein said step of allowing the interface to cool occurs upon attainment of a fusion welding temperature of substantially 300 degrees F.

* * * * *